(12) United States Patent
McCarthy

(10) Patent No.: US 6,345,852 B1
(45) Date of Patent: Feb. 12, 2002

(54) MOBILE VENDING ASSEMBLY

(76) Inventor: Jeffrey Jack McCarthy, 31123 Island Dr., Gilbralter, MI (US) 48073

( * ) Notice: Subject to any disclaimer, the term of this patent is extended or adjusted under 35 U.S.C. 154(b) by 0 days.

(21) Appl. No.: 09/538,161

(22) Filed: Mar. 29, 2000

(51) Int. Cl.[7] ................................................ B60R 7/00
(52) U.S. Cl. ...................... 296/22; 296/24.1; 296/181
(58) Field of Search ............................... 296/24.1, 181, 296/183, 22

(56) References Cited

U.S. PATENT DOCUMENTS

| | | | |
|---|---|---|---|
| 3,837,300 A | * 9/1974 | Karr | |
| 4,060,111 A | 11/1977 | Burks | |
| 4,167,983 A | * 9/1979 | Seider et al. | ............. 296/22 X |
| 4,236,747 A | * 12/1980 | Ratliff | ........................ 296/24.1 |
| 4,270,319 A | 6/1981 | Spasojevic | |
| 4,299,334 A | 11/1981 | Weatherly | |
| 4,951,308 A | 8/1990 | Bishop et al. | |
| 4,971,377 A | 11/1990 | Aquilante | |
| 5,205,436 A | 4/1993 | Savage | |
| 5,207,784 A | 5/1993 | Schwartzendruber | |
| 5,252,948 A | 10/1993 | Goris et al. | |
| 5,303,844 A | 4/1994 | Muehlberger | |
| 5,367,452 A | 11/1994 | Gallery et al. | |
| 5,372,416 A | 12/1994 | Shapley et al. | |
| 5,385,266 A | 1/1995 | Pate | |
| 5,397,176 A | 3/1995 | Allen et al. | |
| 5,482,139 A | 1/1996 | Rivalto | |
| 5,526,615 A | * 6/1996 | Kaizu et al. | .................. 52/79.6 |
| 5,738,243 A | 4/1998 | Broadstreet | |
| 5,791,450 A | 8/1998 | Oden | |
| 5,833,295 A | * 11/1998 | Farlow, Jr. | ................. 296/22 X |
| 5,918,491 A | 7/1999 | Maxwell et al. | |
| 5,967,364 A | 10/1999 | Swanson et al. | |
| 5,988,431 A | * 11/1999 | Roe | ............................ 221/132 |
| 5,997,170 A | 12/1999 | Brodbeck | |
| 6,003,008 A | 12/1999 | Postrel et al. | |
| 6,082,956 A | * 7/2000 | Pentland | ...................... 414/495 |
| 6,189,944 B1 | * 2/2001 | Piche | .......................... 296/22 |

* cited by examiner

Primary Examiner—Joseph D. Pape
(74) Attorney, Agent, or Firm—MacMillan, Sobanski & Todd, LLC

(57) ABSTRACT

A mobile vending assembly includes a vending machine and a portable structure. The portable structure encloses and protects the vending machine. The structure includes a bay for locating and supporting the vending machine defined by a base, walls, a roof, and a door, wherein the door includes an opening permitting access to the vending machine located in the bay. The structure can include options such as removable wheels, a removable hitch, an electrical outlet, an awning, a microprocessor, a generator, and access panels.

20 Claims, 3 Drawing Sheets

MOBILE VENDING ASSEMBLY

BACKGROUND OF THE INVENTION

This invention relates to portable structures, and in particular is concerned with a structure for enclosing, protecting and transporting vending machines to a desired location.

Vending machines provide patrons with articles such as food and drink. Vending machines are generally self-contained and transportable to a desired location. However, it is desirable that a supporting surface be available for a vending machine at the desired location. Also, it is desirable that some form or part of structure is available to shelter a vending machine from the elements of the weather. Vending machines at remote locations are subject to vandalism. It is desirable to enclose a vending machine to reduce the likelihood of vandalism.

SUMMARY OF THE INVENTION

The present invention includes a portable vending structure for enclosing and protecting vending machines. The portable vending structure provides a base for a vending machine so that the machine can be easily transported to and deposited at a remote site, such as a construction site. The portable vending structure includes side walls and a roof to shelter the vending machine from the elements of the weather. A door having openings permits access to the vending machine while reducing the likelihood of vandalism. The portable vending structure and its vending machines form a mobile vending assembly that can be easily transported to a desired location such as a construction or event site to provide articles to patrons.

In a preferred embodiment a mobile vending assembly includes a vending machine and a portable structure. The portable structure encloses and protects the vending machine. The structure includes a bay for locating and supporting the vending machine defined by a base, walls, a roof, and a door, wherein the door includes an opening permitting access to the vending machine located in the bay. The structure can include options such as removable wheels, a removable hitch, an electrical outlet, an awning, a microprocessor, a generator, and access panels.

Various objects and advantages of this invention will become apparent to those skilled in the art from the following detailed description of the preferred embodiments, when read in light of the accompanying drawings.

DETAILED DESCRIPTION

Figure 1:
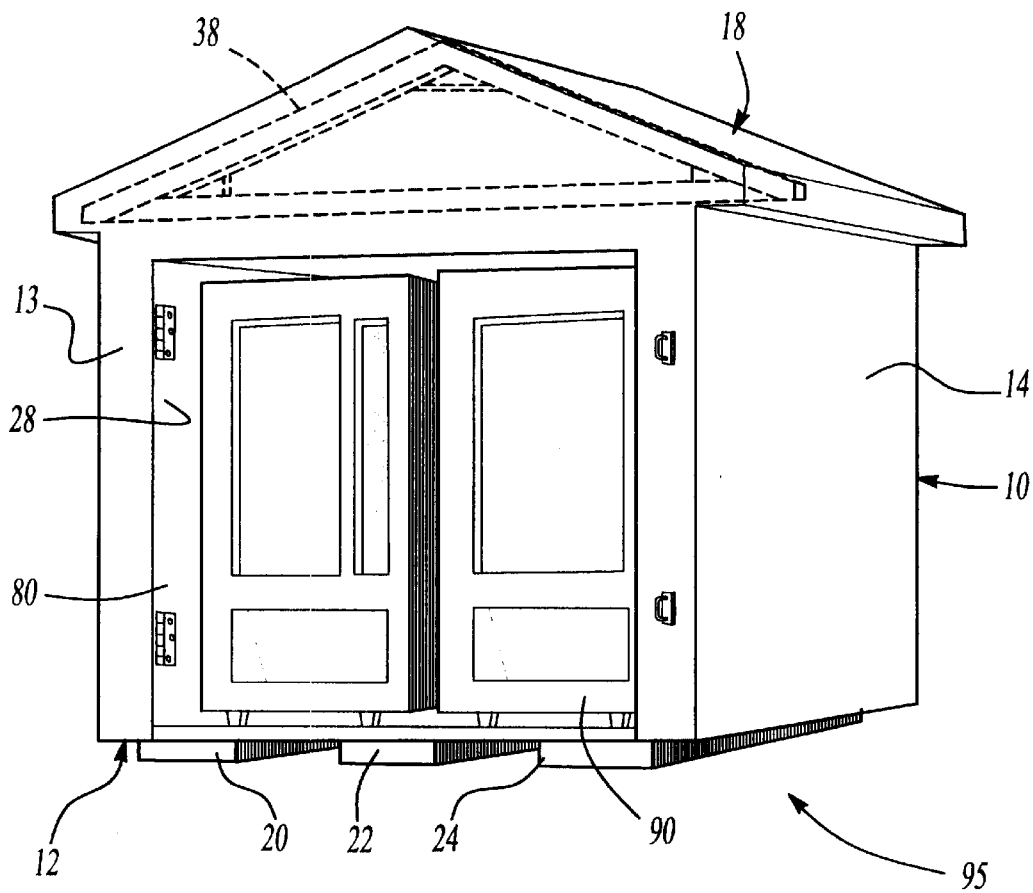
FIG. 1 is a perspective view of a first embodiment of a portable vending structure according to this invention wherein a door has been removed to illustrate a pair of vending machines mounted in the structure.

A portable vending structure according to this invention is indicated generally at 10 in FIG. 1. The structure 10 encloses and protects one or more vending machines. The vending machines may be of any conventional type of vending machine for dispensing articles such as food and drinks. The structure 10 can also enclose and protect other vending machines such as automatic transaction machines and the like. In FIG. 1, vending machines 80 and 90, each mounted on wheels or casters, are shown inside the structure 10.

The vending machines 80 and 90 and the structure 10 form a mobile vending assembly 95. The assembly 95 is easily transported to a desired location such as a construction or event site. Patrons can access the assembly to receive desired objects dispensed from the mobile vending assembly 95.

Figure 2:
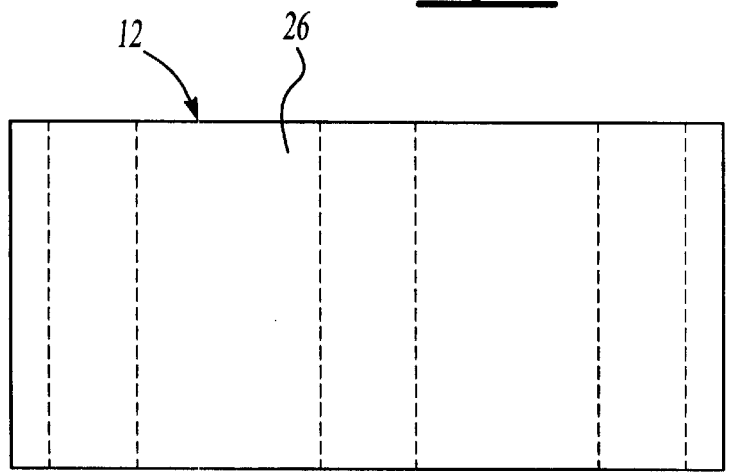
FIG. 2 is a top view of a base of the portable vending structure of FIG. 1 removed from the balance of the structure for clarity of illustration.
Figure 3:
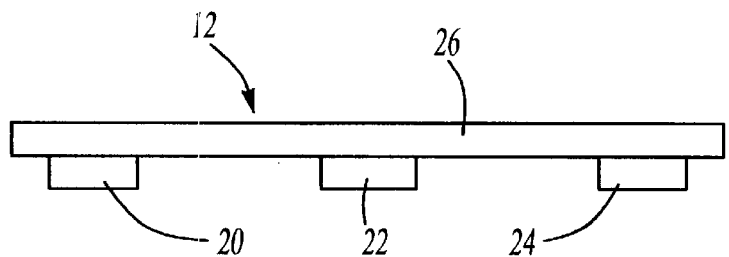
FIG. 3 is a side view of the base of FIG. 2.

The structure 10 can be formed as a crate having a floor and framework sized to accommodate the selected vending machines. In a preferred embodiment, the structure 10 includes a base 12, a front wall 13, side walls 14, a rear wall 15, a door 16, and a roof 18. The base 12, illustrated best in FIGS. 2 and 3, can be formed using slats 20, 22, and 24 covered by a floor 26. Preferably, the slats 20, 22, and 24 are aligned and spaced apart. The slats 20, 22, and 24 can be formed from any desired material including steel and wood. Preferably, the slats 20, 22, and 24 are spaced apart a sufficient distance from each other to accommodate a fork of a forklift truck. The floor 26 is secured to the slats 20, 22, and 24 by any desired means. The floor 26 can be formed from any desired material including steel and wood.

Figure 4:
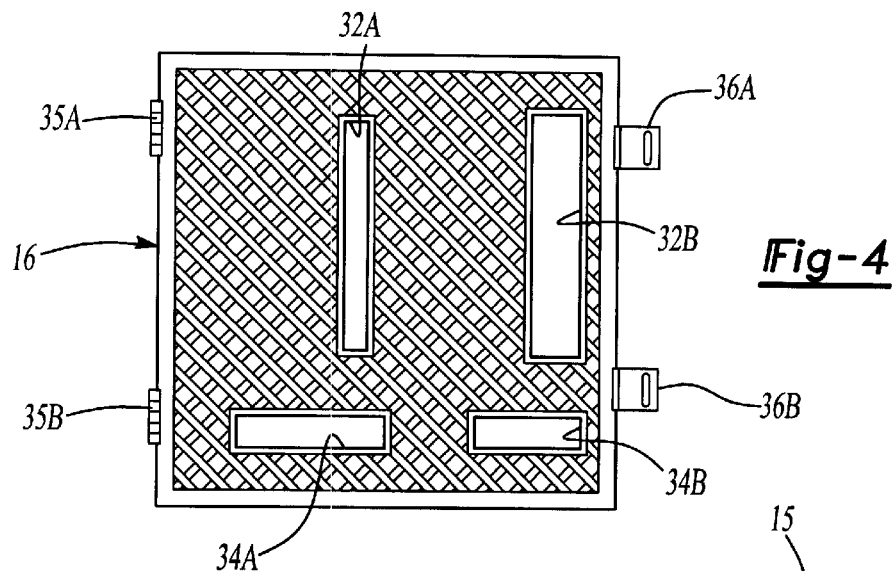
FIG. 4 is a front view of a door for the structure of FIG. 1.
Figure 5:
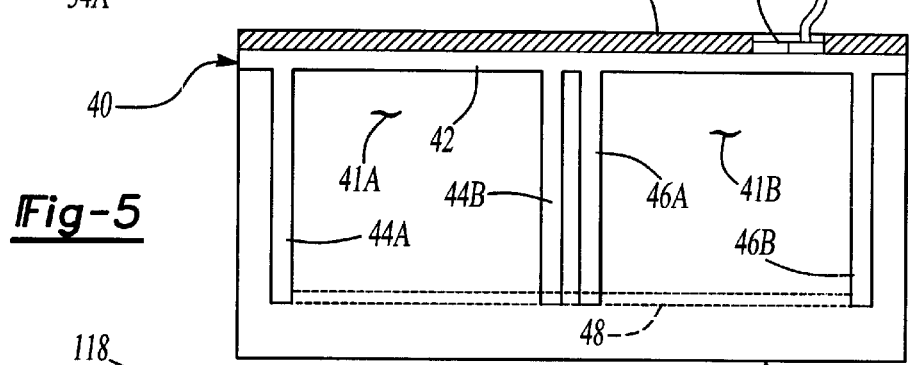
FIG. 5 is a top view of an interior bracket mounted on the base of FIG. 2.

Walls 13, 14, and 15 project upwardly from the base 12. The walls 13, 14, and 15 are preferably formed from a durable material. Signs, banners, lights, and other decorative materials can be mounted on the walls 13, 14, and 15. The front wall 13 includes an opening 28 that receives the door 16. In FIG. 1, the door 16 has been removed from the structure 10 for clarity of illustrating the vending machines 80 and 90. As shown in FIG. 4, the door 16 is preferably formed from a wire mesh and includes openings 32A and 32B to insert payment and select product. Openings 34A and 34B are provided in the door 16 to receive product. The number and size of openings in the door 16 are designed to match the vending machines enclosed by the structure 10. The door 16 is secured to the front wall 13 by hinges 35A and 35B. The door 16 is retained in the closed position by hasps 36A and 36B.

The roof 18 covers the interior of the structure 10. The roof 18 is formed from a durable material to protect the interior from elements of the weather. The roof 18 can include a truss assembly 38 as shown in FIG. 1.

An interior bracket 40 is preferably provided inside the structure 10 to locate and support the vending machines 100 and 200. The bracket 40 defines bays 41A and 41B to receive vending machines 80 and 90, respectively. The bracket 40 includes a rear bar 42 that is secured to the base 12 and/or the rear wall 15. Forwardly extending arms 44A and 44B locate and support vending machine 80 in bay 41A, while forwardly extending arms 46A and 46B locate and support vending machine 90 in bay 41B. A removable front bar 48 can be retained by a locks or push pins on the arms 44A, 44B, 46A, and 46B. Multiple layers of brackets and arms can be provided for supporting the vending machines 80 and 90.

Preferably, the structure 10 includes an electrical outlet 50 into which electric cords from the vending machines 100 and 200 can be plugged. A single cord from the electrical outlet 50 can be connected to a power source at the remote location. The electrical outlet 50 can be mounted on an interior surface of the rear wall 15 or any other desired location.

Figure 6:
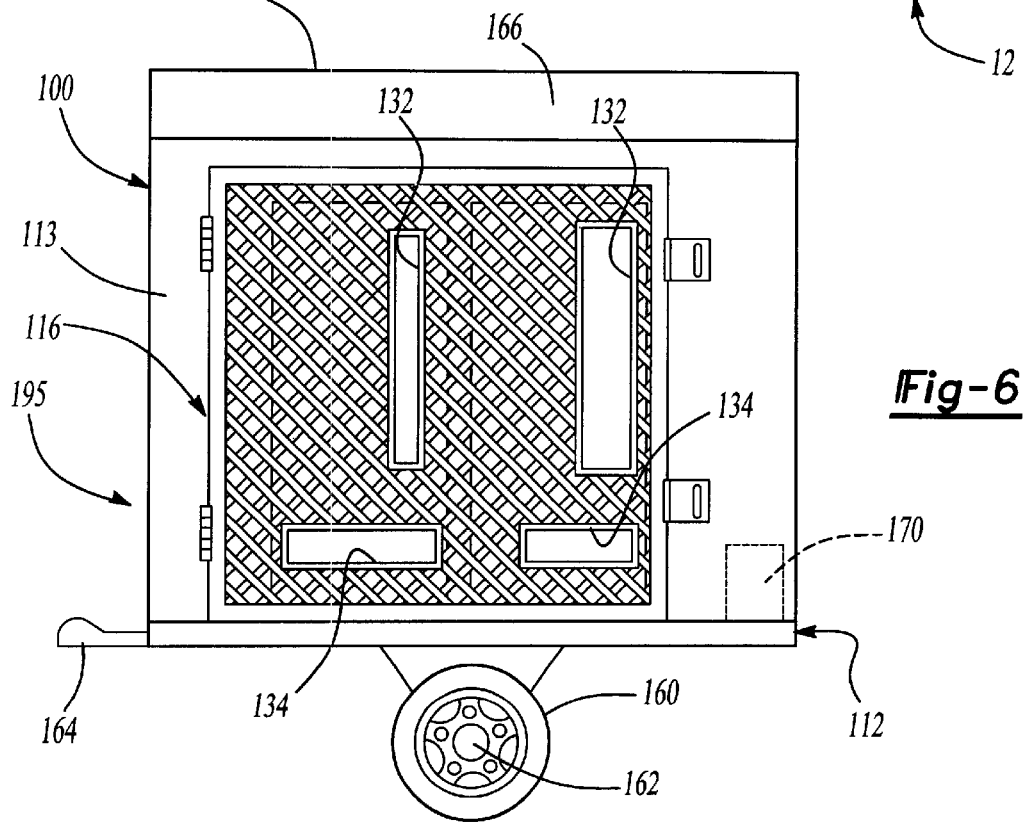
FIG. 6 is front view of a second embodiment of a portable vending structure according to this invention.
Figure 7:
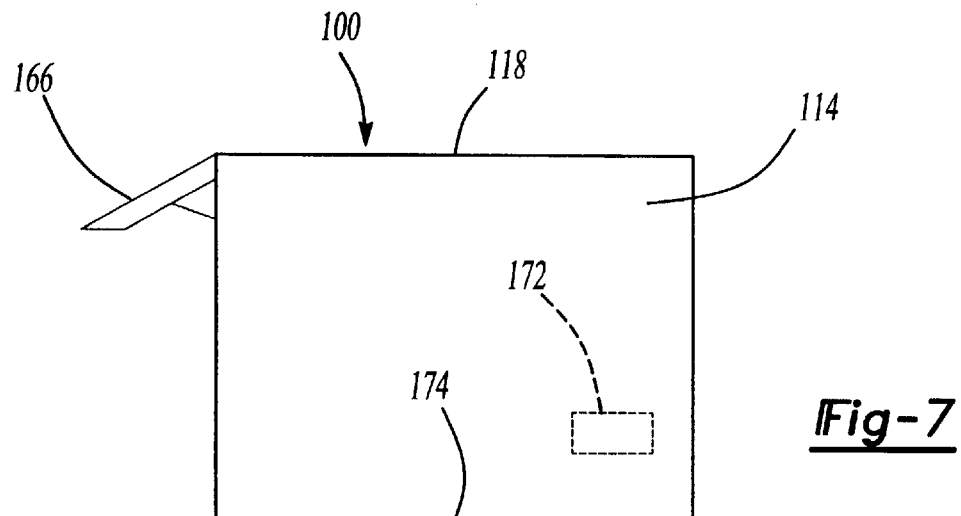
FIG. 7 is side view of the portable vending structure of FIG. 6 wherein the tires, wheels, and hitch have been removed.
Figure 8:
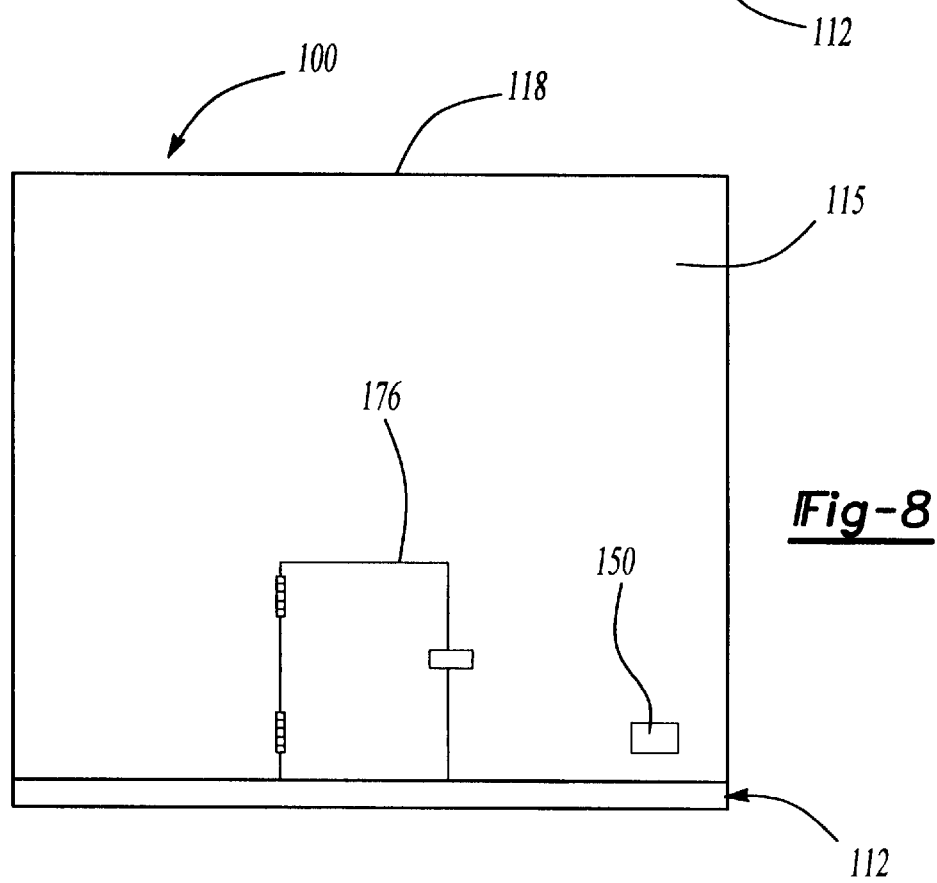
FIG. 8 is a rear view of the portable vending structure of FIG. 7.

A second embodiment of a portable vending structure is indicated generally at 100 in FIGS. 6, 7, and 8. Vending machines are enclosed and protected by the structure 100. The vending machines and the structure 100 form a mobile vending assembly 195.

The structure 100 includes a base 112 upon which a front wall 113, side walls 114, and a rear wall 115 are mounted. A door 116 having openings 132 and 134 is hinged to the front wall 113 to permit access to vending machines enclosed and protected by the structure 100. A roof 118 covers the structure 100. Interior brackets (not shown) can be provided to form bays for locating and supporting the vending machines. An electrical outlet 150 can be provided in any of the walls, including the rear wall 115.

The structure 100 can be formed as a trailer to permit towing. Tires 160 and wheels 162 can be mounted to the base 112. If desired, the tires 160 and wheels 162 can be removed from the base 112 after the structure 100 has been towed to a desired location, as illustrated in FIGS. 7 and 8. A hitch 164 can also be attached to the structure 100 and removed as desired.

The structure 100 can also include other features such as a retractable awning 166. The awning 166 is shown in FIGS. 6 and 7 as attached to the structure 100 at a front edge of the roof 118 and extending outwardly from the front wall 113. The structure 100 can include a generator 170 to provide electricity where none is available at a remote site. A microprocessor 172 with telecommunications capability can be installed in the structure 100 to transmit data concerning the structure 100 and vending machines, such as the need to resupply the vending machines. An access door or panel 174 can be provided in a side wall 114. An access door or panel 176 can be provided in the rear wall 115.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A portable vending structure for enclosing and protecting a vending machine, the portable vending structure comprising:

a base;

walls mounted on the base;

a roof mounted on the walls;

a door provided in one of the walls, the door having openings; and a bay enclosed and protected by the base, walls, roof, and door, and accessible through the openings in the door whereby when a vending machine is positioned in the bay, the structure encloses and protects the vending machine and the openings in the door provide limited access to the vending machine from outside the bay to dispense articles.

2. The portable vending structure specified in claim 1 including an electrical outlet.

3. The portable vending structure specified in claim 1 including a bracket defining the bay.

4. The portable vending structure specified in claim 2 wherein the bracket includes a rear bar, forwardly extending arms, and a removable front bar.

5. The portable vending structure specified in claim 1 including wheels mounted on the base.

6. The portable vending structure specified in claim 5 wherein the wheels are removable.

7. The portable vending structure specified in claim 1 including an awning mounted on the structure and extending outwardly from the one of the walls.

8. The portable vending structure specified in claim 1 including a microprocessor for transmitting data concerning the structure.

9. The portable vending structure specified in claim 1 including an access panel provided in one of the walls.

10. The portable vending structure specified in claim 1 including a generator.

11. A mobile vending assembly comprising:

a vending machine;

a portable structure enclosing and protecting the vending machine, the structure including a bay for locating and supporting the vending machine defined by a base, walls, a roof, and a door mounted on one of the walls, wherein the door includes an opening permitting access to the vending machine located in the bay.

12. The mobile vending assembly specified in claim 11 including a bracket locating and supporting the vending machine, wherein the bracket includes a rear bar, arms, and a front bar.

13. The mobile vending assembly specified in claim 11 including an electrical outlet provided in a wall.

14. The mobile vending assembly specified in claim 11 including wheels mounted on the base.

15. The mobile vending assembly specified in claim 14 wherein the wheels are removable.

16. The mobile vending assembly specified in claim 11 including a hitch mounted on the base.

17. The mobile vending assembly specified in claim 14 wherein the hitch is removable.

18. The mobile vending assembly specified in claim 11 including a microprocessor for transmitting data concerning the assembly.

19. The mobile vending assembly specified in claim 11 including an awning mounted on the assembly and extending outwardly from the one of the walls.

20. The mobile vending assembly specified in claim 11 including a generator mounted on the structure.

* * * * *